3,121,050
METHOD OF MAKING CELLULAR REFRACTORY THERMAL INSULATING MATERIAL
Walter D. Ford, Port Alleghany, Pa., assignor, by mesne assignments, to Union Carbide Corporation, New York, N.Y., a corporation of New York
No Drawing. Filed Sept. 29, 1960, Ser. No. 57,155
12 Claims. (Cl. 252—33)

This invention relates to a method of making cellular refractory thermal insulating material which will withstand high temperatures when used under reducing or inert atmospheres. Cellular insulating refractory material produced according to the invention will withstand temperatures up to 6000° F. when used under reducing or inert atmospheres.

Organic foams are now known, for example, phenol-formaldehyde foams, such foams being useful as thermal insulating materials when used under relatively low temperatures. They may be used as thermal insulations for refrigerators. However, such organic foams are not useful at high temperatures such as would be the case if the organic foams were to be used as furnace linings, since they would melt or decompose under such conditions.

According to the present invention, a thermo setting organic polymer foam having a carbonizing temperature lower than its melting temperature is heated in a non-oxidizing atmosphere at a temperature of about 500 to 6690° F. until substantially all of the volatiles are driven off from the foam, the foam is carbonized and a strong foam is produced. The foam is cooled to a temperature not over about 600° F. in a non-oxidizing atmosphere, after which it can be removed from the furnace. The product so produced is a foam consisting substantially entirely of carbon or graphite depending on the temperature employed in producing it. Where it is desired to produce a product consisting substantially entirely of cellular carbon, the temperature employed is preferably between about 2000 and 2300° F., the preferred temperature being about 2250° F. Where it is desired to produce a cellular product consisting substantially entirely of graphite, the temperature employed is above 2300° F., but not exceeding about 6690° F., which is the volatilization point of carbon.

The organic foam which is to be converted into cellular carbon or graphite by heating in a non-oxidizing atmosphere is preferably first heated slowly, the time depending upon the thickness of the block being treated, for a time and at a temperature sufficient to drive off substantially all of the volatile matter and to carbonize the foam. If the block is heated too rapidly while the volatiles are being driven off, there is a tendency to rupture the cellular structure, or even to cause an explosion. The volatiles which are driven off upon heating consist mainly of hydrogen, oxygen, and water vapor.

The following steps can be employed in carrying out the method according to the invention in order to produce a foam product consisting substantially entirely of carbon, using, for example, as a starting material a one-inch thick block of phenol-formaldehyde foam:

STEP 1

The foam block is heated to about 1000° F. in a neutral or reducing atmosphere, for example a nitrogen atmosphere, in a period of about five minutes.

STEP 2

The block is held at a temperature of about 1000° F. for five or ten minutes to insure that substantially all of the volatiles are driven off and the block is carbonized.

STEP 3

The block is then raised to a temperature of about 2000 to 2300° F., preferably about 2250° F., in a period of about fifteen to twenty minutes. There is nothing critical about the rate of temperature rise during this step; the temperature can be raised slowly or rapidly, but preferably it is raised rapidly for economic reasons.

STEP 4

The block is maintained at a temperature between about 2000 and 2300° F., preferably at about 2250° F., for a time sufficient to give a strong, firm block. Maintaining the block at this temperature for a period of about one hour is sufficient for a block of the given thickness.

STEP 5

The block is then cooled to a temperature below red heat before exposing it to the room atmosphere. It is preferred to cool the block in the furnace to a temperature not exceeding 600° F. while it is maintained under non-oxidizing atmosphere.

STEP 6

The block is then removed from the furnace.

A foam product consisting substantially entirely of graphite can be made using the same steps, but in Steps 3 and 4, employing a temperature above 2300° F., but not exceeding about 6690° F.

Although phenol-formaldehyde foams are the preferred starting materials according to the present invention, any thermo setting organic polymer foam which has a carbonizing temperature below its melting temperature can be employed. These foams are heated under a non-oxidizing atmosphere as described, to drive off substantially all of the volatile matter, to carbonize the foam, or to graphitize the foam, depending upon the temperature employed and to form a foam which is strong and firm and then cooled in the non-oxidizing atmosphere. In addition to foams made from phenol-formaldehyde resins, foams made from urea-formaldehyde resins, foams made from melamine-formaldehyde resins, and foams made from unsaturated polyesters, cross-linked with triallylcyanurate can be employed. In all cases, however, the organic foam must have a carbonizing temperature lower than its melting temperature.

The method of forming the organic foams which, according to the present invention are heated under non-oxidizing conditions in the manner described, forms no part of the present invention. Such methods are well known and many organic foams are on the market and can be used as the starting material for treatment according to the present invention. Speaking generally, however, organic foams are produced by forming a batch containing a suitable resin and reagents which when mixed liberate a gas or gases thereby causing the batch to be converted into a foam. Phenol-formaldehyde foams can be made as described in Krebs et al. Patent 2,845,396. Urea-formaldehyde foams can be made as described in Smithers Patent 2,753,277.

A foam suitable for use as the starting material according to the present invention can be made from a batch consisting of the following ingredients:

| | Parts by wt. |
|---|---|
| Phenol-formaldehyde resin | 100 |
| Sorbitan monopalmitate | 1 |
| Methylene dichloride | 6 |
| Hydrochloric acid (37%) | 12 |
| Sodium carbonate | 1.9 |
| Sodium sulfite | 7 |

The phenol-formaldehyde resin constituent of this batch preferably is the resin sold under the trade name "BRLA 2760," which is manufactured by Bakelite Company Division of Union Carbide Corporation. It is an "A"-stage, alkaline catalyzed, water miscible, phenol-formaldehyde resole resin.

The phenol-formaldehyde foam produced from the above-indicated batch generally has a density of about 3.5 pounds per cubic foot.

The following example further illustrates the invention:

*Example*

The starting material was a block of phenol-formaldehyde foam 16" x 16" x 2", made from the batch above-described, containing the "BRLA 2760" phenol-formaldehyde resin. The block of foam was placed in a closed graphite box, the box was placed in an electric furnace and a positive pressure of nitrogen was maintained inside the furnace chamber and surrounding the graphite box during the entire heating and cooling cycle. The furnace power was turned on and the temperature slowly increased to 500° F. in thirty minutes time. The furnace temperature was then held between 500 and 600° F. for one hour to allow the graphite box and the chamber to equalize in temperature. The temperature was uniformly increased to reach 2200° F. in five hours and the temperature was held at 2200° F. for one hour, at which time the furnace power was cut off and the cooling cycle continued overnight. The graphite box containing the sample was removed from the furnace when the furnace temperature was 300° F.

The block so produced had a density of 2.91 pounds per cubic foot and had an identical cell structure as the foamed resin from which the block was made.

Its thermal insulating value, i.e. "K" value—B.t.u./hr./sq.ft./° F./in., was 0.383 at a mean temperature of 50° F.

The invention is not limited to the preferred embodiment, but may be otherwise embodied or practiced within the scope of the following claims.

I claim:

1. A method of making cellular refractory thermal insulating material which will withstand high temperatures when used under reducing or inert atmospheres, which comprises heating in a non-oxidizing atmosphere at a temperature of about 500 to 6690° F., a thermo setting organic polymer foam having a carbonizing temperature lower than its melting temperature, and cooling the foam to a temperature below red heat in a non-oxidizing atmosphere.

2. A method of making cellular refractory thermal insulating material which will withstand high temperatures when used under reducing or inert atmospheres, which comprises heating in a non-oxidizing atmosphere at a temperature of about 500 to 6690° F., a thermo setting phenol-formaldehyde polymer foam having a carbonizing temperature lower than its melting temperature and cooling the foam to a temperature below red heat in a non-oxidizing atmosphere.

3. A method of making cellular refractory thermal insulating material which will withstand high temperatures when used under reducing or inert atmospheres, which comprises heating in a non-oxidizing atmosphere at a temperature of about 500 to 1000° F., a thermo setting organic polymer foam having a carbonizing temperature lower than its melting temperature, for a time sufficient to drive off substantially all of the volatile matter and to carbonize the foam, thereafter heating the foam in a non-oxidizing atmosphere to a temperature above 1000° F., but not exceeding about 6690° F., to form a strong foam, and cooling the foam to a temperature below red heat in a non-oxidizing atmosphere.

4. A method of making cellular refractory thermal insulating material which will withstand high temperatures when used under reducing or inert atmospheres, which comprises heating in a non-oxidizing atmosphere at a temperature of about 500 to 1000° F., a thermo setting phenol-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature above 1000° F., but not exceeding about 6690° F., to form a strong foam, and cooling the foam to a temperature below red heat in a non-oxidizing atmosphere.

5. A method of making cellular refractory thermal insulating material which will withstand high temperatures when used under reducing or inert atmospheres, which comprises heating in a non-oxidizing atmosphere at a temperature of about 500 to 1000° F., a thermo setting organic polymer foam having a carbonizing temperature lower than its melting temperature, for a time sufficient to drive off substantially all of the volatile matter and to carbonize the foam, thereafter heating the foam in a non-oxidizing atmosphere to a temperature of about 2000° to 2300° F. to form a strong carbon foam, and cooling the foam to a temperature below red heat in a non-oxidizing atmosphere.

6. A method of making cellular refractory thermal insulating material which will withstand high temperatures when used under reducing or inert atmospheres, which comprises heating in a non-oxidizing atmosphere at a temperature of about 500 to 1000° F., a thermo setting phenol-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature of about 2000 to 2300° F. to form a strong carbon foam, and cooling the foam to a temperature below red heat in a non-oxidizing atmosphere.

7. A method of making cellular refractory thermal insulating material which will withstand high temperatures when used under reducing or inert atmospheres, which comprises heating in a non-oxidizing atmosphere at a temperature of about 500 to 1000° F., a thermo setting organic polymer foam having a carbonizing temperature lower than its melting temperature, for a time sufficient to drive off substantially all of the volatile matter and to carbonize the foam, thereafter heating the foam in a non-oxidizing atmosphere to a temperature above 2300° F. but not exceeding about 6690° F. to form a strong graphite foam, and cooling the foam to a temperature below red heat in a non-oxidizing atmosphere.

8. A method of making cellular refractory thermal insulating material which will withstand high temperatures when used under reducing or inert atmospheres, which comprises heating in a non-oxidizing atmosphere at a temperature of about 500 to 1000° F., a thermo setting phenol-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature above 2300° F., but not exceeding about 6690° F., to form a strong graphite foam, and cooling the foam to a temperature below red heat in a non-oxidizing atmosphere.

9. A method of making cellular refractory thermal insulating material which will withstand high temperatures when used under reducing or inert atmospheres, which comprises heating in a non-oxidizing atmosphere at a temperature of about 500 to 6690° F., a thermo setting urea-formaldehyde polymer foam having a carbonizing temperature lower than its melting temperature and cooling the foam to a temperature below red heat in a non-oxidizing atmosphere.

10. A method of making cellular refractory thermal insulating material which will withstand high temperatures when used under reducing or inert atmospheres, which comprises heating in a non-oxidizing atmosphere at a temperature of about 500 to 1000° F., a thermo setting urea-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature above 1000° F., but not exceeding about 6690° F., to form a strong foam, and cooling the foam to a temperature below red heat in a non-oxidizing atmosphere.

11. A method of making cellular refractory thermal insulating material which will withstand high temperatures when used under reducing or inert atmospheres, which comprises heating in a non-oxidizing atmosphere at a temperature of about 500 to 1000° F., a thermo setting urea-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature of about 2000 to 2300° F. to form a strong carbon foam, and cooling the foam to a temperature below red heat in a non-oxidizing atmosphere.

12. A method of making cellular refractory thermal insulating material which will withstand high temperatures when used under reducing or inert atmospheres, which comprises heating in a non-oxidizing atmosphere at a temperature of about 500 to 1000° F., a thermo setting urea-formaldehyde polymer foam having a carbonizing temperature lower than its melting temperature, for a time sufficient to drive off substantially all of the volatile matter and to carbonize the foam, thereafter heating the foam in a non-oxidizing atmosphere to a temperature above 2300° F., but not exceeding about 6699° F., to form a strong graphite foam, and cooling the foam to a temperature below red heat in a non-oxidizing atmosphere.

References Cited in the file of this patent

UNITED STATES PATENTS

| | | |
|---|---|---|
| 1,156,509 | Weintraub et al. | Oct. 12, 1915 |
| 1,491,474 | Gelius | Apr. 22, 1924 |
| 2,733,221 | Kish et al. | Jan. 31, 1956 |
| 2,753,277 | Smithers | July 3, 1956 |
| 2,758,940 | Baker et al. | Aug. 14, 1956 |
| 2,845,396 | Krebs et al. | July 29, 1958 |
| 3,007,822 | Kaiser et al. | Nov. 7, 1961 |
| 3,027,278 | Reick | Mar. 27, 1962 |

FOREIGN PATENTS

| | | |
|---|---|---|
| 688,419 | Great Britain | Mar. 4, 1953 |